(12) United States Patent
Zhang et al.

(10) Patent No.: US 10,572,499 B2
(45) Date of Patent: Feb. 25, 2020

(54) DISPLAYING A HIERARCHICAL DATA STRUCTURE WITHIN A GRAPHICAL USER INTERFACE

(71) Applicant: International Business Machines Corporation, Armonk, NY (US)

(72) Inventors: Li Zhang, Ningbo (CN); Jie Jiang, Ningbo (CN); Wen Juan Nie, Ningbo (CN); Zai Cen, Ningbo (CN); Ke Huan Uy Yin, Ningbo (CN); Jie Chen, Luzhou (CN); Qi Ruan, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/380,632

(22) Filed: Apr. 10, 2019

(65) Prior Publication Data

US 2019/0236075 A1    Aug. 1, 2019

Related U.S. Application Data

(63) Continuation of application No. 15/654,143, filed on Jul. 19, 2017.

(51) Int. Cl.
*G06F 16/25* (2019.01)
*G06F 3/0484* (2013.01)
*G06F 3/0481* (2013.01)

(52) U.S. Cl.
CPC ........ *G06F 16/252* (2019.01); *G06F 3/04817* (2013.01); *G06F 3/04842* (2013.01); *G06F 3/04847* (2013.01)

(58) Field of Classification Search
CPC .................................................... G06F 16/252
USPC ......................................................... 707/803
See application file for complete search history.

(56) References Cited

U.S. PATENT DOCUMENTS

| 5,926,180 | A | 7/1999 | Shimamura |
| 6,104,400 | A | 8/2000 | Halachmi |
| 7,193,584 | B2 | 3/2007 | Lee |
| 7,509,348 | B2 | 3/2009 | Burtner |
| 8,584,047 | B2 | 11/2013 | Athans |
| 9,442,637 | B1 | 9/2016 | Kocsor |
| 2012/0278762 | A1* | 11/2012 | Mouilleseaux ....... G06F 3/0482 715/834 |

(Continued)

FOREIGN PATENT DOCUMENTS

| JP | 2016057928 | 4/2016 |
| WO | 2016116891 | 7/2016 |

OTHER PUBLICATIONS

Accelerated Examination Support Document, U.S. Appl. No. 15/896,303, dated Feb. 2, 2018, 20 pgs.

(Continued)

*Primary Examiner* — Pierre M Vital
*Assistant Examiner* — Andrew N Ho
(74) *Attorney, Agent, or Firm* — Kelli D. Morin (57) ABSTRACT

A data structure is dynamically displayed within a graphical user interface with an initial setting information. User input that provides instructions to adjust the setting information is received. The received user input is parsed to identify a position portion, a motion portion, and a magnitude portion. The setting information is adjusted based on the received user input. The data structure is dynamically displayed according to the adjusted setting information.

1 Claim, 7 Drawing Sheets

(56) References Cited

U.S. PATENT DOCUMENTS

| | | | |
|---|---|---|---|
| 2013/0019191 A1* | 1/2013 | Arnold | G06F 3/04886 715/765 |
| 2015/0046882 A1 | 2/2015 | Menyhart | |
| 2015/0331555 A1 | 11/2015 | Keondjian et al. | |
| 2015/0355716 A1 | 12/2015 | Balasubramanian | |
| 2015/0355794 A1 | 12/2015 | Spaulding | |
| 2015/0378562 A1 | 12/2015 | Ramanathan | |
| 2016/0291848 A1 | 10/2016 | Hall | |
| 2016/0357416 A1 | 12/2016 | Abuduweili | |
| 2017/0046860 A1 | 2/2017 | Barosi | |
| 2017/0102844 A1* | 4/2017 | Brown | G06F 3/0485 |
| 2017/0201709 A1 | 7/2017 | Igarashi | |
| 2018/0129401 A1 | 5/2018 | Kim | |
| 2018/0150193 A1 | 5/2018 | Cao | |
| 2018/0150194 A1 | 5/2018 | Cao et al. | |
| 2019/0026286 A1 | 1/2019 | Zhang | |
| 2019/0026287 A1 | 1/2019 | Zhang | |

OTHER PUBLICATIONS

Craig et al., "The Mobile Tree Browser: A Space Filling Information Visualization for Browsing Labelled Hierarchies on Mobile Devices," 2015 IEEE International Conference on Computer and Information Technology; Ubiquitous Computing and Communications; Dependable, Autonomic and Secure Computing; Pervasive Intelligence and Computing, pp. 2240-2247, © 2015 IEEE.

Douma et al., "SpicyNodes: Radial Layout Authoring for the General Public," IEEE Transactions on Visualization and Computer Graphics, vol. 15, No. 6, pp. 1089-1096, Dec. 2009.

Draper et al., "A Survey of Radial Methods for Information Visualization," IEEE Transactions on Visualization and Computer Graphics, vol. 15, No. 5, pp. 759-776, Sep./Oct. 2009.

Hao et al., "A Mobile Interface for Hierarchical Information Visualization and Navigation," 7 pgs., IEEE International Symposium on Consumer Electronics, 2007. ISCE 2007.

Hao et al., "Visualizing and Navigating Hierarchical Information on Mobile User Interfaces," International Journal of Advanced Intelligence, vol. 2, No. 1, pp. 81-103, Jul. 2010, © AIA International Advanced Information Institute.

List of IBM Patents or Patent Applications Treated as Related, Apr. 10, 2019, 2 pgs.

Nguyen et al., "A Space-Optimized Tree Visualization," Proceedings of the IEEE Symposium on Information Visualization 2002, (InfoVis'02), 8 pgs., © 2002 IEEE.

Nguyen et al., "Space-Optimized Tree: A Connection+Enclosure Approach for the Visualization of Large Hierarchies," (abstract only), first published Mar. 1, 2003, 6 pgs.

Weixin et al., "Visualization of Large Hierarchical Data by Circle Packing," CHI 2006 Proceedings, Visualization and Search, pp. 517-520, Apr. 22-27, 2006, Montreal, Quebec, Canada.

Zhang et al., "Hierarchical Data Structure," U.S. Appl. No. 15/896,303, filed Feb. 14, 2018.

* cited by examiner

DISPLAYING A HIERARCHICAL DATA STRUCTURE WITHIN A GRAPHICAL USER INTERFACE

BACKGROUND

The present invention relates generally to the field of data processing, and more particularly to utilizing a graphical user interface for navigating within a data structure.

Graphical user interface (GUI) is a type of user interface that allows a user to interact with an electronic device through manipulation of graphical icons and visual indicators. GUIs may be used in many types of electronic devices, such as smart phones, tablets, laptops, gaming devices, and desktop computers. GUIs are intended to simplify an end user's interaction with a software program with common graphical icons referred to as widgets, thereby increasing the usability of an electronic device.

SUMMARY

Embodiments of the present invention disclose a method, computer program product, and system for dynamically displaying a data structure within a graphical user interface. A data structure is dynamically displayed within a graphical user interface with an initial setting information. User input that provides instructions to adjust the setting information is received. The received user input is parsed to identify a position portion, a motion portion, and a magnitude portion. The setting information is adjusted based on the received user input. The data structure is dynamically displayed according to the adjusted setting information.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Tree structures are most widely used to display data in hierarchical relations (e.g., in a digital library navigation). However, this traditional linear tree structure has at least two disadvantages. The first disadvantage is that, on mobile devices where space is limited, the linear tree structure is not space-effective. A user can hardly get the entire tree structure within a mobile display without minimizing the tree structure so that it fits within the mobile screen, which may result in making the tree structure extremely difficult to read clearly, or moving the tree structure within the display up and down, left and right. If the user wants to access data at lower levels, the user would have to go down level-by-level to reach the data he wants.

The second disadvantage is if the user zooms in on the tree structure, a portion of the tree structure may not be included within the mobile display, so he might easily forget a part of the tree structure not within the mobile display. For example, if the user wants to read a specific topic that is at a fifth level in an online library, the user would have to expand the parent topics individually over four levels. As the user finally reaches the fifth topic, he might wonder or forget how he reached the fifth topic. Furthermore, expanding or folding a tree structure node on a touch screen is extremely inconvenient.

Therefore, it may be advantageous to implement a data structure as a radial map that includes one or more levels within a GUI. This radial map is extendable in size at each level to make a target level more prominent and clearly visible to the user while minimizing levels that a user may not want to view. The minimized levels may still be displayed within the GUI, but with less detail. Although the minimized levels may have less detail, the user may still access information from the minimized levels. This radial map can be tilted to give the user a look down perspective, which can foreground the target topics included within the target levels, and background the unwanted topics that are included within the minimized levels.

A feature of a radial map is that it is more "space-effective" than a linear-binary tree map, and is more suitable for mobile devices that have a limited screen size. The user can view details without losing the whole sight of the structure, and the user would not need to go down level-by-level in order to reach a specific topic. Radial maps can accommodate touch screen gestures more efficiently than tree structures. The user could modify the radial map with different colors to show which topics are most frequently visited or most recently visited (e.g. used for data analysis), or are closely related to other topics. Moreover, historical data may be recorded into a setting information table, including the user's preferences, to generate a radial map customizable to the user. In some embodiments, the setting information table may be an initial setting information table that is the default setting information table. The generated radial map may be displayed within a user's device.

Aspects of the present disclosure are directed to improvements in existing GUI devices that have no representation of a data hierarchy as a radial map analog. Furthermore, aspects of the present disclosure may require a specific, structured graphical user interface paired with a prescribed functionality directly related to the graphical user interface's structure that is addressed to and resolves a specifically identified problem of fitting a data structure or a large amount of data, that would not otherwise be able to fit within the confines of a GUI display, within the display. Moreover, the setting information table may have a system administrator (e.g., a computer system or processor) that may intelligently condense the data according to known data compression techniques in order to fit the data within a particular space in memory, thereby freeing memory space for data to be stored for other jobs. Aspects of the present disclosure may have the historical data previously stored within the setting information table saved within a data repository for future use. Prior to display of the radial data structure, a system may intelligently access historical data stored within the data repository to determine a display based on past user preferences, thereby saving time and resources that would otherwise be wasted on the user adjusting the data structure to his preferences. Aspects of the present disclosure may display the last user settings that were used for a particular application, or use saved settings across multiple applications, and/or may synchronize with other devices that the user owns, thereby reducing the other device's computing resources. Furthermore, one or more processors and/or processing resources within the server that would have been wasted on the user adjusting the data structure within the GUI to match his preferences would be saved to execute other jobs. Aspects of the present disclosure may automatically convert the data structure from an original data structure (e.g., tree) to a radial data structure based on user preferences, thereby saving time and computing resources.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
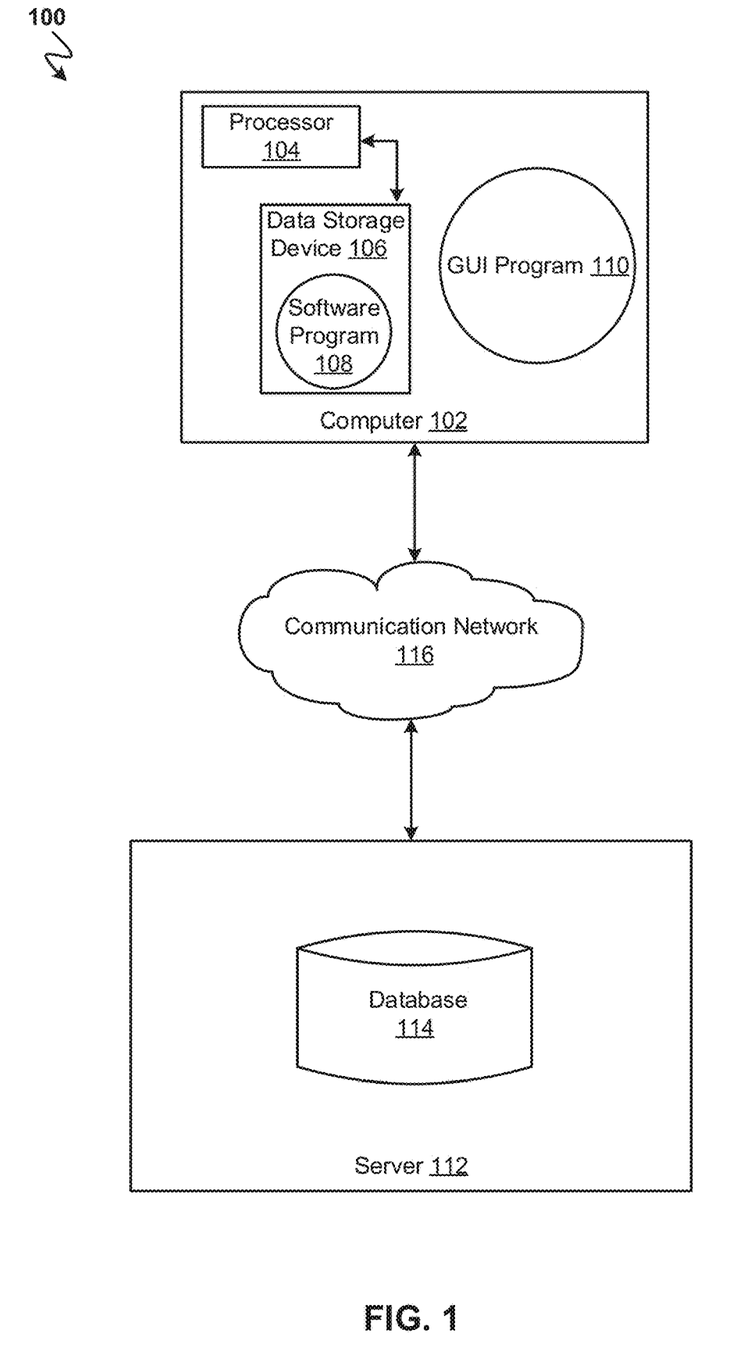
FIG. 1 illustrates a networked computer environment, according to at least one embodiment.

Referring to FIG. 1, an exemplary networked computer environment 100 in accordance with at least one embodiment is depicted. The networked computer environment 100 may include a computer 102 with a processor 104 and a data storage device 106 that is enabled to run a software program 108 and a GUI program 110. The networked computer environment 100 may also include a server 112 that includes a database 114 and can communicate over a communication network 116 with the computer 102. The networked computer environment 100 may include one or more computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the GUI program 110 may interact with a database 114 that may be embedded in various storage devices, such as, but not limited to a computer/mobile device 102, a networked server 112, or a cloud storage service. The database 114 can include a repository of any transactions associated or initiated with the GUI program 110. The GUI program 110 may be updated in any system associated with the GUI program 110 (e.g., database 114).

According to the present embodiment, a user using a client computer 102 may use the GUI program 110 that receives user-input, that provides directions on how to display a data structure within a GUI, interprets the received user-input, and then dynamically displays an adjusted data structure within a GUI based on the received user-input. The dynamic data structure method is explained in more detail below with respect to FIGS. 2, 3, 4, 5, and 6.

Figure 2:
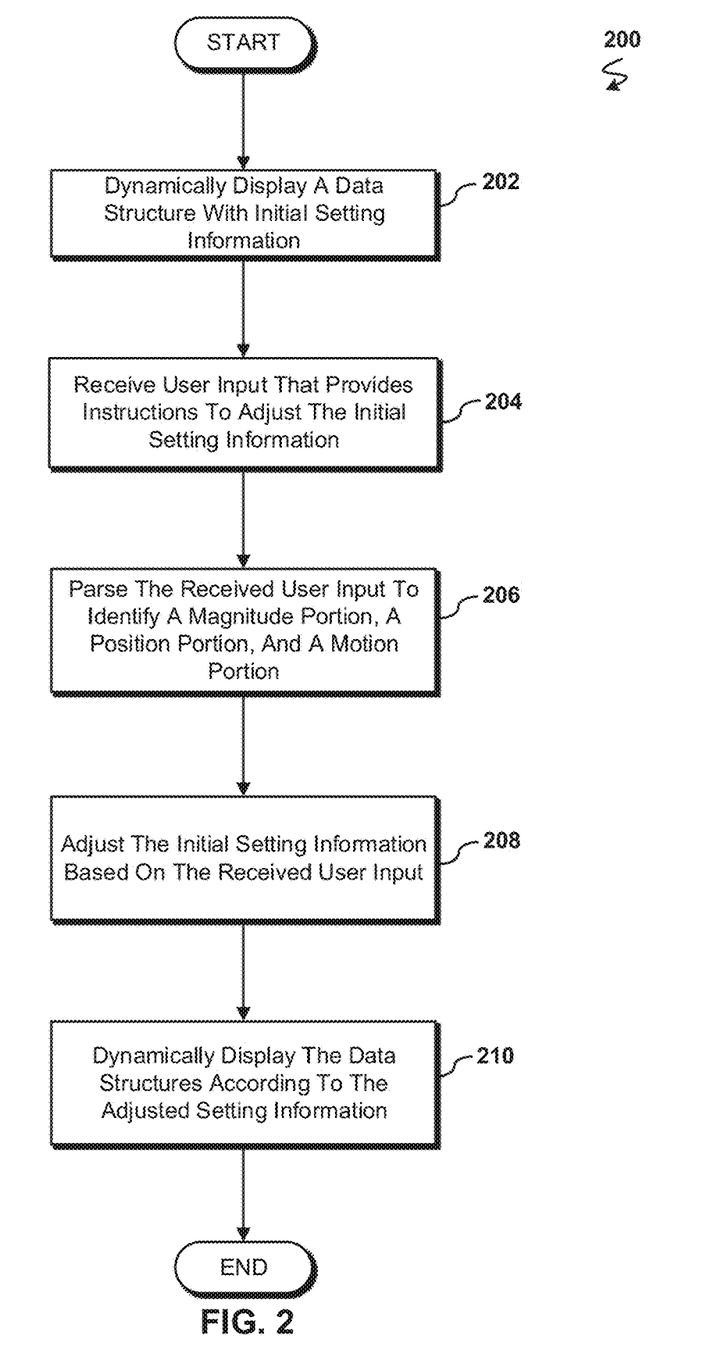
FIG. 2 illustrates an operational flowchart illustrating an example data structure adjustment process by a GUI program, according to at least one embodiment.

Referring now to FIG. 2, an operational flowchart illustrating an exemplary dynamic data structure adjustment process 200 executed by the GUI program 110 according to at least one embodiment is depicted. At 202, the GUI program 110 displays a data structure with setting information. The data structure may be displayed within a GUI, and may be in any shape (e.g. a radial shape, an elliptical shape, a square shape, and/or some combination thereof) that expresses a data hierarchy (e.g., a tree graph). The setting information may be the settings that define the shape of the data structure. The setting information may also include color, font, line length, line width, or any information associated with the data structure. The setting information may be in the form of a table, a list with categories and their associated qualities, or a tuple. The setting information may be a default setting information that displays the data structure when a user requests to view the data structure. Additionally, the setting information may be based on a user's historical data of previous data structure adjustments, or a user's predefined preference (e.g., color, shape, line length, line width, font, etc.).

The data structure may be displayed within a computing device (e.g., computer 102), mobile device (e.g., tablet, smart phone, laptop, etc.), or the like. The computing device or mobile device displaying the data structure may have a touch screen able to receive user input in the form of touch or auditory commands, or receive input from an external device (e.g., a keyboard, a mouse, or a microphone). The data structure may be information formatted in a categorically hierarchical structure (e.g., an employee organization chart, a phylum, timeline with dates and associated events, etc.).

At 204, the GUI program 110 receives user input that provides instructions to adjust the setting information. The user input may be in the form of physical touch from a user. For example, a user placing his fingers on the touch screen and moving his fingers in a predetermined gesture that signals the data structure to rotate or tilt in a certain way that depends on the magnitude of the user input. The magnitude of the user input may be based on the amount of time the user's finger(s) is in contact with the touch screen, the distance of the user's fingers traversing the touch screen, or the rate (distance of fingers traversing the touch screen per time spent traversing the touch screen). In some embodiments, the user input may be the amount of pressure exerted by the user on the screen, the rate at which the user moves his fingers along the screen, and/or the angular rotation of the user rotating his fingers in a counter clockwise or clockwise direction. The received input can be any number of gestures adjusting the data structure within the GUI. For example, the received input can be rotating the data structure within the GUI with respect to any axis of the data structure (e.g., along a longitudinal, horizontal, or zed axis). The received input can be a magnification of a certain portion of the data structure and/or a compression of the remaining portion of the data structure. In some embodiments, magnifying the certain portion of the data structure may result in compressing the remaining portion of the data structure.

Next, at 206, the GUI program 110 parses the received user input to identify a motion, position, and magnitude of the received user input. The GUI program 110 may utilize analytical software to recognize the received user input by comparing the input to a set of predefined inputs, e.g., a language (e.g., a computer programmable language, such as C++, Python, Java, etc.) that is compatible with the setting information. For example, there may be a rotation row or column within the setting information table that corresponds to a rotation of the data structure and a direction of that movement, and the analytical software may recognize by comparing the received user input within the table. In some embodiments, the parsing may be accomplished by determining the amount of pressure exerted by the user on the screen, the rate at which the user moves his fingers along the screen, and/or the angular rotation of the user rotating his fingers in a counter clockwise or clockwise direction. In some embodiments, parsing may include determining the distance of the user's fingers, or point at which the user touches the screen, to the nearest level (e.g., Level A 302) and then compare that distance to the distance to the next closest level to the user's point of contact with the screen, in order to determine within a degree of certainty that the user means to select a particular level within the GUI.

In some embodiments, the GUI program 110 may break the input into its syntactic and semantic components, and then compare the syntactic and semantic components to a language that is predefined with the setting information. The GUI program 110 may then parse the compared user input to identify a motion (e.g., rotation, magnification, compression, etc.) of the data structure, an initial position, and a final position of the motion, and a magnitude of the motion. In some embodiments, the GUI program 110 may determine a value for the position, the motion, and the magnitude. For example, a grid for the GUI may be utilized to determine a position value of the user contacting the touch screen, and the position value may be in terms of the location of contact within the grid. The motion value may be a direction of movement that the user is traversing his finger(s) across the touch screen. The magnitude value may be the distance the user traversed (e.g., rotational or translational distance) the touchscreen per unit time.

At 208, the GUI program 110 adjusts the setting information based on the received user input. The GUI program 110 may insert the parsed received user input into the information-setting table to replace the setting information. For example, the determined values may be added to the setting information table. In some embodiments, the setting information may be from a previous time the user utilized the GUI and the data structure may be dynamically displayed according to a previously received user input; the determined values may replace the previously determined values within the setting information table. The previously determined values within the setting information table may be stored in a data repository (e.g., database 114) for future use. For example, statistical analysis may be performed on the stores values in order to determine and/or predict user preferences. This may be useful for when an ambiguous user input is received (e.g., the user placed his fingers almost exactly between two levels) and the user may have historically adjusted one level more than the other level. In this embodiment, the GUI program 110 may determine which level the user chose. The GUI program 110 may adjust a layout of the data structure based on the change in the information-setting table. In some embodiments, the setting information table includes options selected by the user, such as font color and data structure shape.

At 210, the GUI program 110 dynamically displays the data structure according to the adjusted setting information. In some embodiments, the display may include a graphical icon for the user to select that saves the current display of the data structure, and/or a graphical icon that goes back to a previous display. In some embodiments, the display may further include functionality that allows the user to modify the color of nodes or the color of each level. In some embodiments, not all levels may be adjusted equally. For example, levels further from the adjustment point (e.g., further from the level being expanded) may be adjusted more than levels closer to the adjustment point. Likewise, portions (e.g., a portion that includes particular nodes or a top portion of a level) within the same level may be adjusted differently (e.g., with reference to FIG. 5 that includes a tilted radial map, nodes in the foreground may be larger than nodes in the background, even if the nodes are included in a same level). In some embodiments, nodes near a user's finger may get larger (magnified and/or zoomed in on) while user is touching or hovering near screen. Once the GUI program 110 dynamically displays the data structure according to the adjusted setting information, the dynamic data structure adjustment process 200 may terminate.

Figure 3:
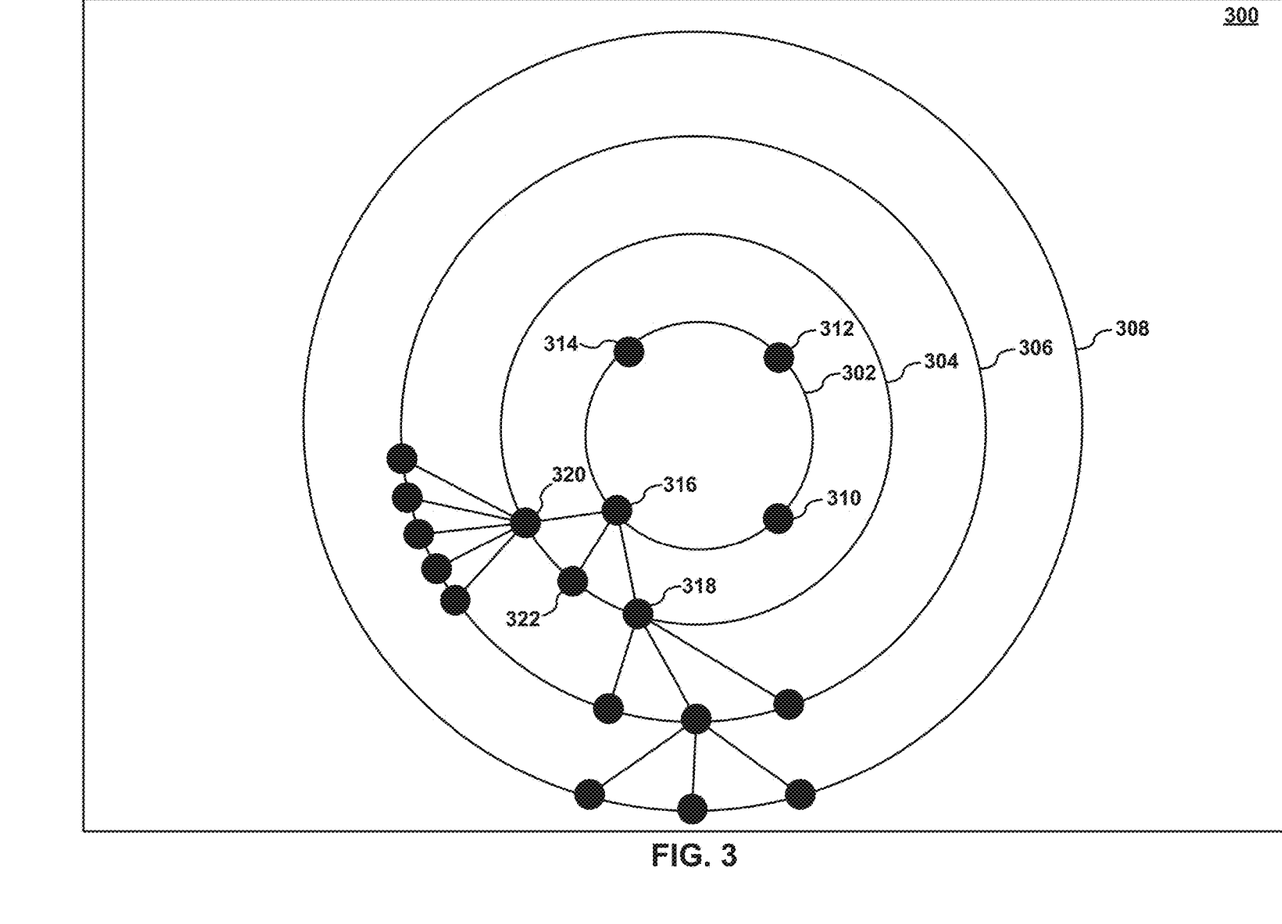
FIG. 3 illustrates a close-up view of a portion of an exemplary GUI implementation of a data structure represented as a radial map, according to at least one embodiment.

FIG. 3 illustrates an exemplary data structure displayed within a GUI 300 using setting information, in accordance with embodiments of the present disclosure. The exemplary data structure is displayed within the GUI 300 as a radial map that includes one or more levels: level A 302, level B 304, level C 306, and level D 308. Each of the one or more levels 302, 304, 306, and 308 may have one or more nodes that may represent a piece of digital information, e.g. a employee organizational chart or a pay scale chart, within a data structure. Level A 302 may include four nodes: node A 310, node B 312, node C 314, and node D 316, that may each represent a vice president for a particular division within the organization. Level B 304 may include three nodes: node E 318, node F 320, and node G 322, that may each represent a manager for the particular division. Level C 306 may include eight nodes that may each represent senior lead engineers directly below the managers. Level D 308 may include three different nodes that may represent associate engineers reporting to a particular senior lead engineer. The one or more levels 302, 304, 306, and 308 may be connected through related nodes.

The GUI 300 may be displayed within any computing device (e.g., computer 102) that includes a touch screen. The computing device may be a mobile device (e.g., tablet, smart phone, laptop, etc.). The touch screen may be able to receive user input via a user touching the screen that can manipulate the data structure within the GUI 300. The user may use his fingers to expand a certain portion of the data structure (e.g., a certain level) while collapsing the remaining levels by contacting the screen with two fingers and moving them in opposite directions, as referred to in FIG. 4. The user may rotate the data structure within the GUI 300 so that a certain level may come to a foreground of the GUI while some of the remaining levels are placed in a background of the GUI. This may be accomplished by the user contacting the touch screen with two fingers and then rotating each finger in a clockwise or a counter clockwise direction, as referred to in FIG. 5.

Figure 4:
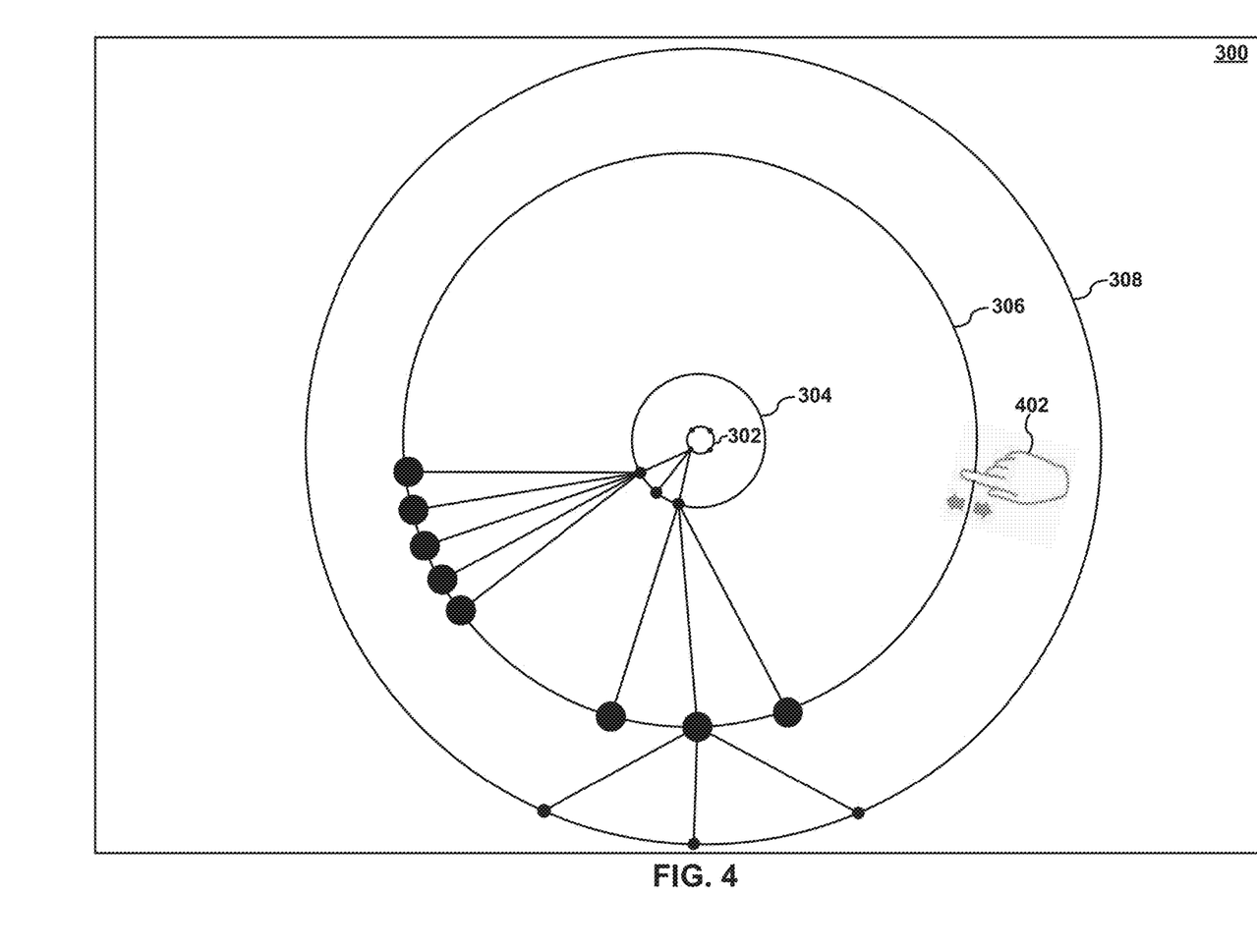
FIG. 4 illustrates a close-up view of a portion of an exemplary GUI contorted by a user manipulating the GUI so that a portion of the radial map is expanded, according to at least one embodiment.

FIG. 4 illustrates an exemplary data structure 400 with adjusted setting information within a GUI 300 that has been adjusted based on received user input by a user's fingers 402, in accordance with embodiments of the present disclosure. The received user input may be to expand the level C 306 while minimizing the remaining levels 302, 304, and 308. The minimizing may include collapsing the levels 302, 304, and 308 so that detail of the levels 302, 304, and 308 may still be visible, and the detail may be selected, but the detail is not interfering or obstructing level C 306. The level C 306 may be expanded by a user contacting the touchscreen at a position near level C 306 with two fingers and moving them in opposite directions. The user may expand any level 302, 304, 306, or 308 by changing the location of contact to a level he wants to expand. In some embodiments, the user may expand multiple levels at the same time. For example, the user may expand two adjacent levels (e.g., levels 306 and 308) by starting his finger motion from an area between the two levels. The user may also readjust the display of the data structure within the GUI 300 by contacting the touch screen at the same position, and moving his fingers, starting from a position that are far from each other, and then moving them closer to each other. The user may also minimize certain levels 302, 304, 306, and 308 without readjusting the remaining levels the user did not minimize.

Figure 5:
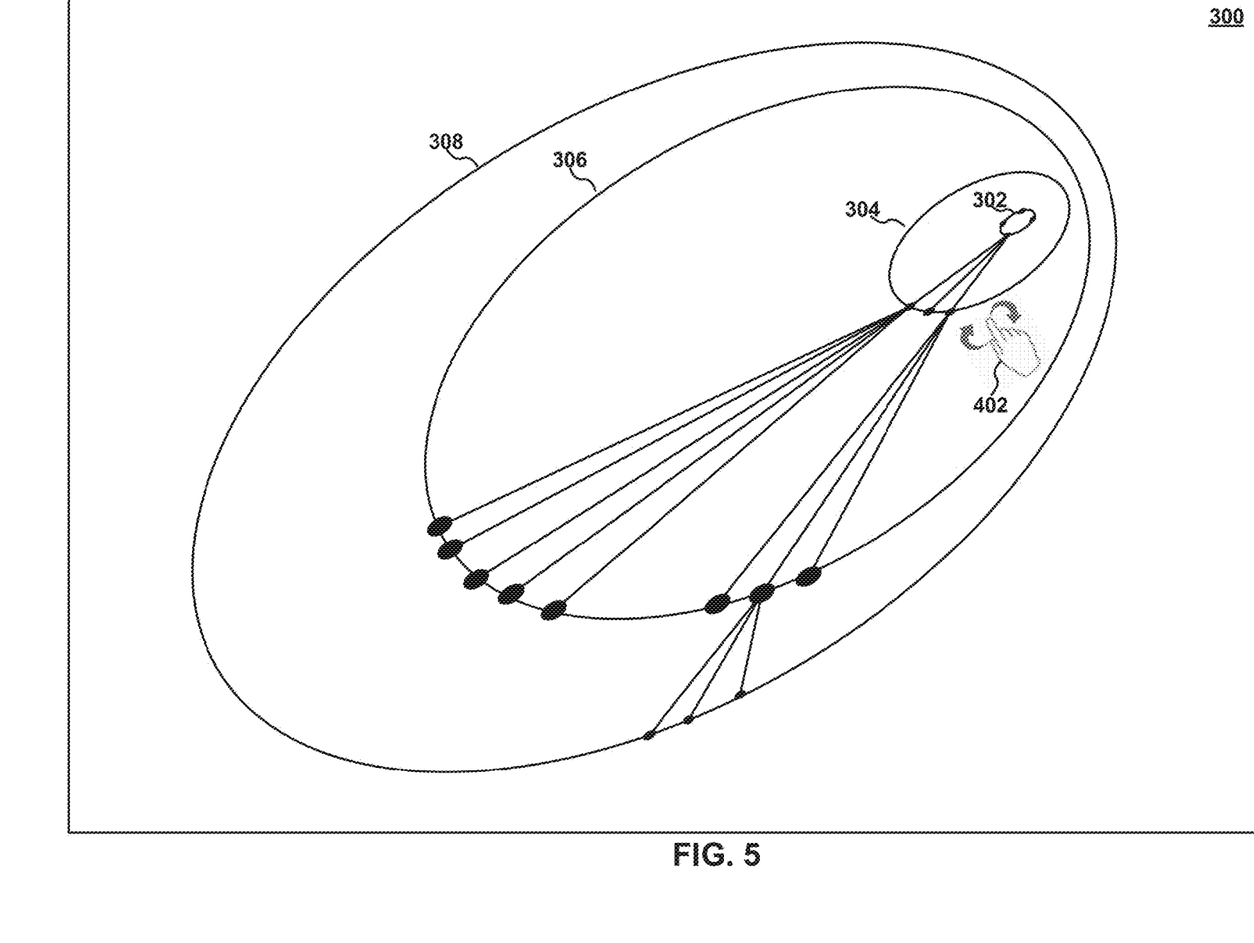
FIG. 5 illustrates a close-up view of a portion of an exemplary GUI contorted by a user manipulating the GUI so that the radial map is tilted, according to at least one embodiment.

FIG. 5 illustrates an exemplary data structure with adjusted setting information within a GUI 300 that has been adjusted based on received user input, in accordance with embodiments of the present disclosure. The received user input may be a user's fingers 402 contacting a touchscreen of the computing device. The user may rotate the data structure within the GUI 300 so that a certain level (e.g., level D 308) may come to a foreground of the GUI while some of the remaining levels (e.g., level A 302, level B 304, and level C 306) are placed in a background of the GUI. This may be accomplished by the user contacting the touch screen with two fingers 402 and then simultaneously rotating each finger in a clockwise or a counter clockwise direction. The rotation may occur after the level C 306 has been expanded, as referenced in FIG. 4. The user may contact the touch screen from any position on the touch screen with his hand 402. The rotation of the data structure may be dependent of on the position of the user's contact with the touch screen, as well as the magnitude of the contact. The rotation may be about an axis of the data structure. For example, the rotation may occur along a vertical axis that is perpendicular to the plane of the radial map, along a horizontal axis that is within the plane of the radial map, or any combination thereof. The detail in the background, such as portions of the level A 302, level B 304, level C 306, and level D 308 may be minimized so that a majority of the GUI 300 may display the foreground of the GUI 300 more clearly.

Figure 6:
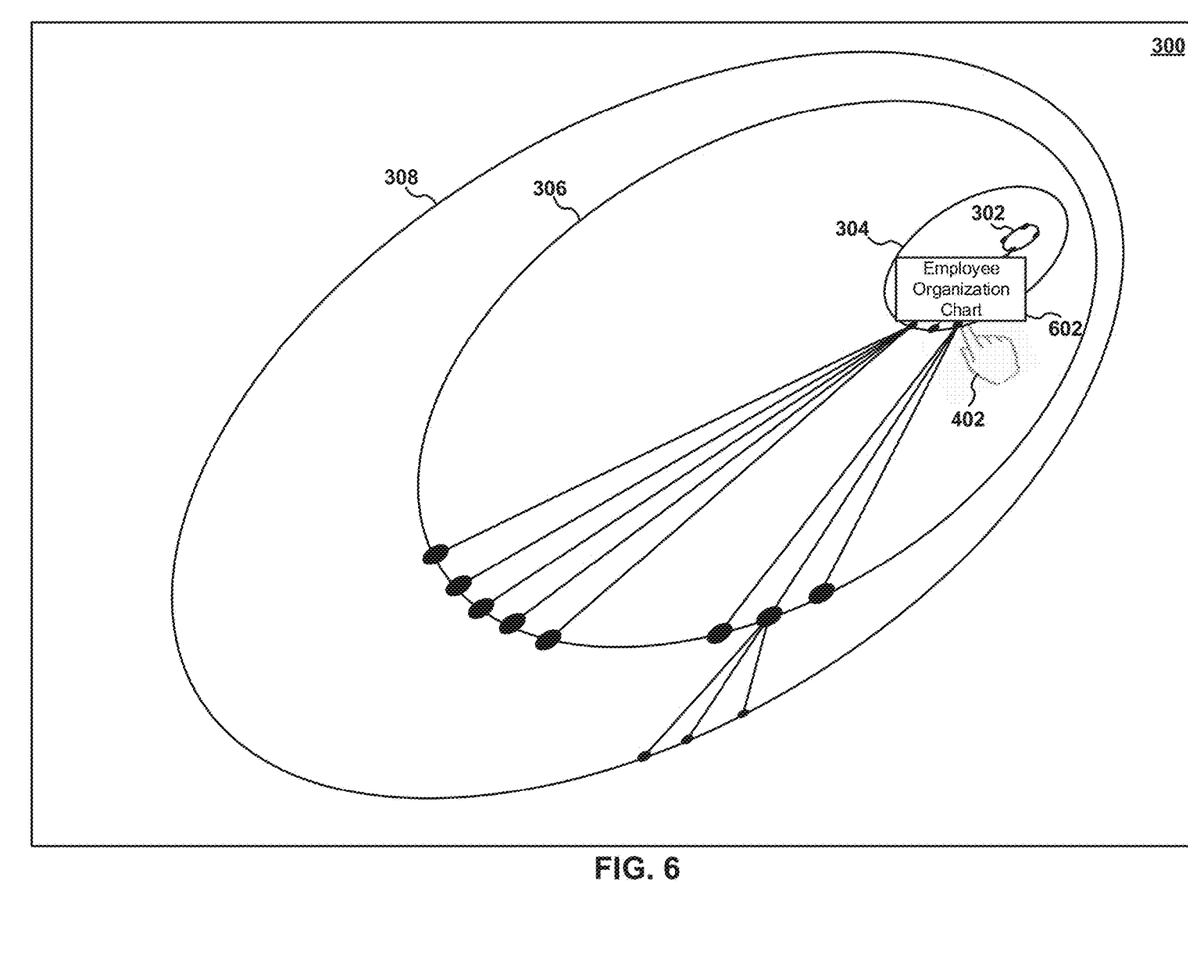
FIG. 6 illustrates a close-up view of a portion of an exemplary GUI implementation of a user selecting a graphical icon within the GUI, according to at least one embodiment.

FIG. 6 illustrates an exemplary data structure with adjusted setting information within a GUI 300 that is displaying a node's information 602 response to a user's fingers 402 hovering over the node, in accordance with embodiments of the present disclosure. The node's information 602 may be in the form of a box with text that includes a summary of any information related to the node. In some embodiments, the node's information 602 may display in response to the user's fingers 402 being within a proximity (e.g., within one, two, or more pixels) of the node. Any node's information may be displayed when the user's fingers 402 hovers over, or is within a proximity of, the node, even for nodes that have been minimized from levels collapsing, or are in a background. The user may enlarge the node's information 602 to a predefined size by making contact anywhere within the node's information 602 box. The predefined size may be a multiple of the current node's information 602 box size. For example, the predefined size may be multiplying the resolution by a number (e.g., 1.5, 2, etc.), or by adding a predefined number of pixels to the length and to the width of the node's information 602 box. In some embodiments, the node's information 602 may be expanded or contracted by a user dragging the outline of the node's information 602 box in any direction.

It may be appreciated that FIGS. 2, 3, 4, 5, and 6 provide only an illustration of one embodiment and do not imply any limitations with regard to how different embodiments may be implemented. Many modifications to the depicted embodiment(s) may be made based on design and implementation requirements.

Figure 7:
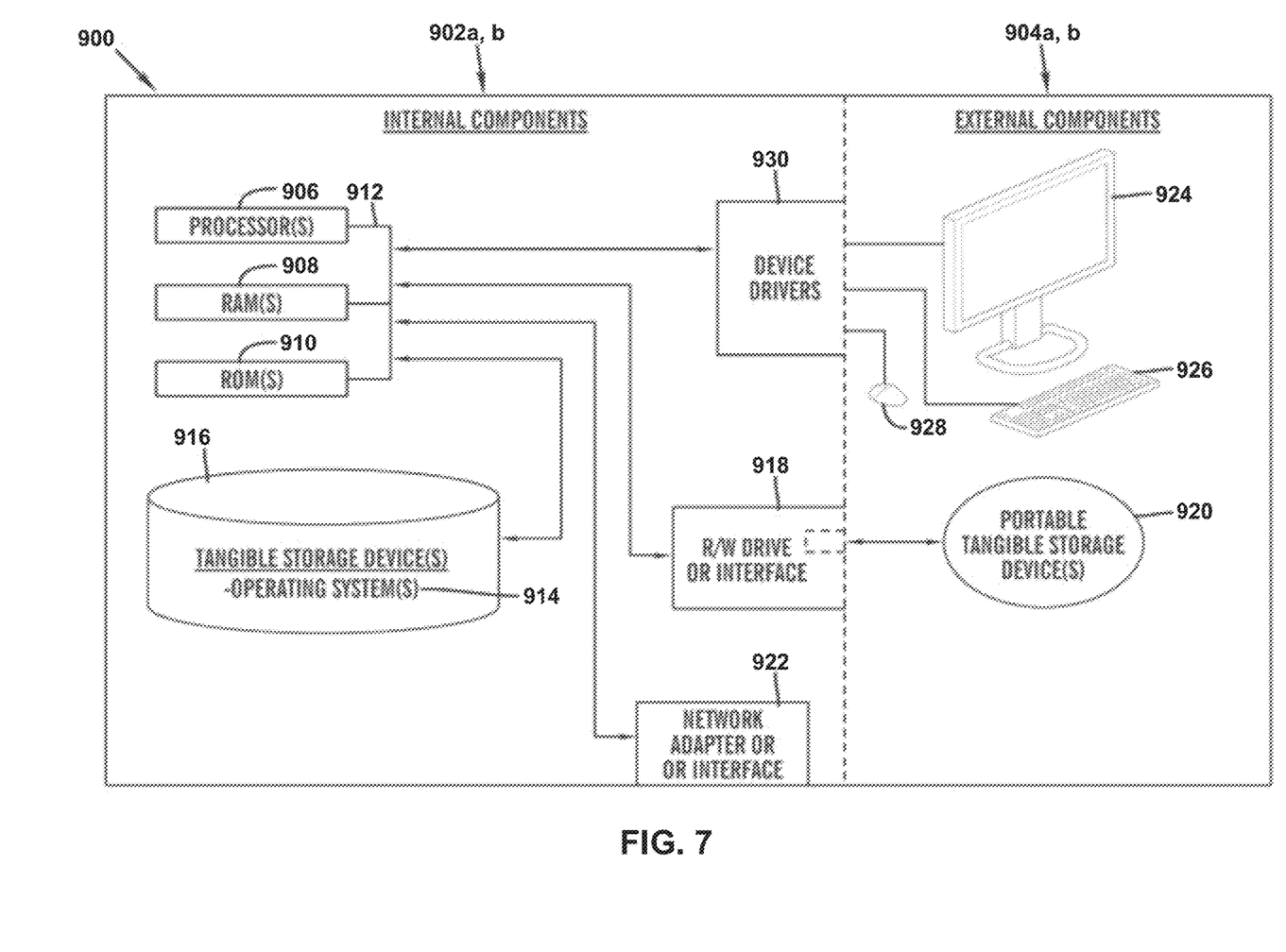
FIG. 7 is a block diagram of internal and external components of computers and servers depicted in FIG. 1, according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902*a, b*, and 904*a, b* is representative of any electronic device capable of executing machine-readable program instructions. Data processing system 902*a, b*, and 904*a, b* may be representative of a smart phone, a computer system, PDA, or other electronic devices. Examples of computing systems, environments, and/or configurations that may represented by data processing system 902*a, b*, and, 904*a, b* include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 may include respective sets of internal components 902*a, b* and external components 904*a, b* illustrated in FIG. 7. Each of the sets of internal components 902*a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 and the GUI program 110 in client computer 102 in network server 112 (FIG. 1), may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the GUI program 110 can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the GUI program 110 in client computer 102 in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the GUI program 110 in client computer 102 in network server computer 112 are loaded into the respective hard drive 916. The network may comprise copper wires, optical fibers, wireless transmission, routers, firewalls, switches, gateway computers, and/or edge servers.

Each of the sets of external components 904a, b can include a computing device 924 that may be a mobile device (e.g., tablet, smart phone, laptop, etc.) 924 or any computing device with an integrated touch screen capable of receiving user input as described in the present disclosure, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computing device 924, keyboard 926 and computer mouse 928. The device drivers 930, R/W drive or interface 918 and network adapter or interface 922 comprise hardware and software (stored in tangible storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for dynamically displaying a data structure within a graphical user interface (GUI), the method comprising:

displaying, in a GUI, a hierarchical data structure according to an initial setting information, wherein the setting information includes text color options, data structure shape options that define an initial shape for the hierarchical data structure, text font, line length, and line width, wherein the setting information is based in part on a user's historical data of previous data structure adjustments;

receiving user input to adjust the setting information, wherein the received user input is to expand a first portion of the data structure while minimizing a second portion of the data structure, wherein the user input is in the form of physical touch from a user;

parsing the received user input to identify a position portion, a motion portion, and a magnitude portion;

storing the parsed received user input into a data repository for future use;

updating a user's preference based on the stored parsed received user input;

utilizing statistical analysis techniques on the parsed received user input in order to predict user preferences;

determining a value for each of the position, the motion, and the magnitude in response to parsing the received user input, wherein the position value is the position of a touch screen where the user contacts, the motion value is a direction of rotational and translational movement of the user contacting the screen, and the magnitude value is a distance the user traversed on the touch screen per unit time;

adding the determined position value, motion value, and magnitude value to a setting information table to be saved for future use;

adjusting the setting information based on the position value, motion value, and magnitude value, wherein the adjusted setting information includes new data structure shape options that define a new shape for displaying the data structure; and     dynamically displaying, in the GUI, the data structure according to the new shape using the adjusted setting information, wherein the data structure is displayed as a radial map, wherein each of two or more levels of the radial map includes at least one node that links to one or more further nodes of a different level, wherein all of the nodes of the two or more levels are displayed in the GUI in both the initial shape and the new shape, wherein dynamically displaying the data structure further comprises:

changing a size of a first set of nodes in a first level of the two or more levels relative to a size of a second set of nodes in a second level of the two or more levels;

changing a space between the first set of nodes in the first level and the second set of nodes in the second level;

dynamically displaying node information for a particular node that is included within one of the two or more levels of the radial map in response to the user hovering over the particular node;

receiving a second user input to adjust a shape of a container that the particular node information is displayed within; and adjusting the shape of the container based on the received second user input, wherein adjusting the shape of the container includes expanding or contracting the shape of the container such that a shape of at least one further node that is linked to the particular node is also adjusted.

\* \* \* \* \*